United States Patent
Matsuoka et al.

(10) Patent No.: US 7,892,615 B2
(45) Date of Patent: Feb. 22, 2011

(54) COATING MATERIAL COMPOSITION WITH GAS-BARRIER PROPERTY, PROCESS FOR PRODUCING THE SAME, AND GAS-BARRIER PACKAGING CONTAINER OBTAINED THEREFROM

(75) Inventors: Yutaka Matsuoka, Osaka (JP); Yoshiaki Ueno, Osaka (JP); Masanori Kano, Osaka (JP)

(73) Assignee: Sakata Inx Corp., Osaka (JP)

( * ) Notice: Subject to any disclaimer, the term of this patent is extended or adjusted under 35 U.S.C. 154(b) by 407 days.

(21) Appl. No.: 10/567,152

(22) PCT Filed: Aug. 4, 2003

(86) PCT No.: PCT/JP03/09849

§ 371 (c)(1), (2), (4) Date: Jul. 10, 2008

(87) PCT Pub. No.: WO2005/012594

PCT Pub. Date: Feb. 10, 2005

(65) Prior Publication Data

US 2008/0274350 A1    Nov. 6, 2008

(51) Int. Cl.
*B32B 27/20* (2006.01)
*B32B 27/30* (2006.01)
*B32B 27/32* (2006.01)
*B32B 27/34* (2006.01)
*B32B 27/36* (2006.01)

(52) U.S. Cl. .................. 428/36.6; 428/35.7; 428/38.9; 428/36.91; 428/323; 428/331; 428/332; 428/334; 428/339; 428/474.4; 428/476.3; 428/480; 428/483; 428/515; 428/516; 428/520; 428/522; 428/523; 524/442; 524/444; 524/445; 524/447; 524/450; 524/456

(58) Field of Classification Search ............ None
See application file for complete search history.

(56) References Cited

U.S. PATENT DOCUMENTS

| | | | | |
|---|---|---|---|---|
| 5,428,094 A * | 6/1995 | Tokoh et al. | 524/379 |
| 5,552,469 A * | 9/1996 | Beall et al. | 524/445 |
| 5,578,672 A * | 11/1996 | Beall et al. | 524/446 |
| 5,616,286 A * | 4/1997 | Jordan | 516/80 |
| 5,698,624 A * | 12/1997 | Beall et al. | 524/445 |
| 5,700,560 A * | 12/1997 | Kotani et al. | 428/325 |
| 5,760,121 A * | 6/1998 | Beall et al. | 524/450 |
| 5,766,751 A * | 6/1998 | Kotani et al. | 428/323 |
| 5,830,528 A * | 11/1998 | Beall et al. | 427/220 |
| 5,845,326 A * | 12/1998 | Hirayama et al. | 711/135 |
| 5,942,298 A * | 8/1999 | Sakaya et al. | 428/36.6 |
| 5,969,029 A * | 10/1999 | Kotani et al. | 524/447 |
| 5,981,029 A * | 11/1999 | Harada et al. | 428/143 |
| 6,057,396 A * | 5/2000 | Lan et al. | 524/445 |
| 6,087,433 A * | 7/2000 | Hanada et al. | 524/492 |
| 6,225,394 B1 * | 5/2001 | Lan et al. | 524/445 |
| 6,232,388 B1 * | 5/2001 | Lan et al. | 524/445 |
| 6,384,121 B1 * | 5/2002 | Barbee et al. | 524/445 |
| 6,395,386 B2 * | 5/2002 | Bagrodia et al. | 428/323 |
| 6,596,807 B2 * | 7/2003 | Oshita et al. | 524/557 |
| 6,726,997 B2 * | 4/2004 | Tamori et al. | 428/447 |
| 6,727,001 B2 * | 4/2004 | Hochi et al. | 428/520 |
| 6,740,396 B2 * | 5/2004 | Carrus et al. | 428/331 |
| 6,821,373 B1 * | 11/2004 | Berlin et al. | 156/244.11 |
| 7,157,147 B2 * | 1/2007 | Inui et al. | 428/451 |
| 2001/0036545 A1 * | 11/2001 | Nishi et al. | 428/315.7 |
| 2001/0056136 A1 * | 12/2001 | Hasegawa et al. | 523/205 |
| 2003/0072891 A1 * | 4/2003 | Murakami et al. | 427/569 |
| 2006/0141178 A1 * | 6/2006 | Matsuoka et al. | 428/34.2 |
| 2009/0148640 A1 * | 6/2009 | Yoshida et al. | 428/36.6 |

FOREIGN PATENT DOCUMENTS

| | | | |
|---|---|---|---|
| EP | 1538127 A1 | | 6/2005 |
| JP | 62-202735 | | 9/1987 |
| JP | 05-140344 | * | 6/1993 |
| JP | 5-140344 A | | 6/1993 |
| JP | 07-251871 | * | 10/1995 |
| JP | 9-174772 | | 7/1997 |
| JP | 11-246728 | * | 9/1999 |
| JP | 2000-063607 | * | 2/2000 |
| JP | 2000-119471 | * | 4/2000 |
| JP | 2000-191874 | * | 7/2000 |
| JP | 2001-172443 | * | 6/2001 |
| WO | 98/56861 A1 | | 12/1998 |
| WO | 00/49072 A1 | | 8/2000 |

OTHER PUBLICATIONS

International Search Report dated Dec. 24, 2003 of PCT/JP2003/009849.
European Search Report dated Apr. 23, 2009, issued in corresponding European Patent Application No. 03817780.4.
European Office Action dated Aug. 25, 2009 issued in European patent Application No. 03817780.4.

* cited by examiner

*Primary Examiner*—Vivian Chen
(74) *Attorney, Agent, or Firm*—Westerman, Hattori, Daniels & Adrian, LLP

(57) ABSTRACT

The present invention provides a coating material composition with a gas-barrier property which comprises, as essential components, an ethylene-vinyl alcohol copolymer (A) obtained by saponifying an ethylene-vinyl acetate copolymer, an inorganic layered compound (B) and a solvent, wherein the total amount of (A) and (B) is 1 to 30% by mass and the mass ratio (A)/(B) is (30/70) to (50/50). The coating material provides gas-barrier properties to packaging materials.

8 Claims, No Drawings

COATING MATERIAL COMPOSITION WITH GAS-BARRIER PROPERTY, PROCESS FOR PRODUCING THE SAME, AND GAS-BARRIER PACKAGING CONTAINER OBTAINED THEREFROM

TECHNICAL FIELD

This invention relates, for example, to a coating material composition with a gas-barrier property which is mainly used in manufacturing packaging containers for foods and drugs. More particularly, it relates, for example, to a coating composition with a gas-barrier property which can form a gas-barrier layer which, even when thinner, still has high gas-barrier properties and which can be applied in the packaging container field where higher gas-barrier properties are required, unlike the prior art coating material composition with a gas-barrier property which cannot be applied in such field of use.

BACKGROUND ART

Plastic containers and paper containers have so far been used widely in packaging foods and drugs as well. Furthermore, recently, attempts have been made to make use of such characteristics features thereof as easy moldability and light weights and widen the field of use thereof to those containers for liquid food products and the like the mainstream of which has so far been represented by metal cans and glass bottles.

Plastics and paper, when considered as base materials for packaging materials, have many excellent characteristic features in addition to those mentioned above. As compared with metals and glass, however, they are basically inferior in the ability to block the passage of gases such as oxygen and water vapor (gas-barrier properties), readily allowing the contents to become deteriorated or putrefied as a result of oxidation or moisture absorption. When they are used as packaging containers for carbonated drinks, for example, they present a drawback that carbon dioxide escapes, leading to the loss of the cooling and refreshing sensation, and the like.

Therefore, in cases where a plastic or paper is used as the base material for packaging containers, the packaging containers are provided with a gas-barrier layer made of a specific material in addition to the base material layer so that the gas-barrier properties thereof may be improved.

In cases where a plastic container is to be provided with a gas-barrier layer, the simplest method employed in the art comprises coating the container with a vinylidene chloride resin, which is excellent in gas-barrier property. However, the vinylidene chloride resin, which is a chlorine-containing compound, is currently a material to be kept at a distance since it may cause the formation of hazardous substances on the occasion of disposal and incineration.

Furthermore, the method comprising providing a gas-barrier layer using an aluminum foil or aluminum vapor deposited film, or a metal oxide vapor deposited film is now also employed and it is very effective for the purpose of obtaining packaging containers with high gas-barrier properties. However, these materials have problems, for example; they are expensive and increase the cost of containers, and the use thereof is restricted to those containers which have a form allowing the lamination with such a film-shaped material. Furthermore, the aluminum foil and aluminum vapor deposited film cannot be used in those containers required to be transparent. Another problem is, for example, that they damage incinerators on the occasion of incineration. Metal oxide vapor deposited films also have further problems; for example, they readily allow peeling off or cracking of the vapor deposited layer and are difficult to handle.

Furthermore, recently, researches have been made concerning the method of providing a high gas-barrier layer at low cost by coating with an eco-friendly chlorine-free compound resin, for example a polyvinyl alcohol resin, ethylene-vinyl alcohol copolymer (EVOH) or the like. These resins are characterized by their high crystallinity, and polyvinyl alcohol resin species higher in crystallinity show very good gas-barrier properties in a dry condition but they are highly hygroscopic and therefore have a problem in that, under high humidity conditions, their crystallinity falls and their gas-barrier properties deteriorate. In the case of the ethylene-vinyl alcohol copolymer, their gas-barrier properties are deteriorated under high humidity conditions to a lesser extent as compared with the polyvinyl alcohol resin but their gas-barrier property level is generally unsatisfactory.

Therefore, coating material compositions with gas-barrier properties in which a resin having a gas-barrier property and an inorganic layered compound are used in combination have been investigated to solve the problems discussed above. Thus, Japanese Kokai Publication Hei-05-140344 discloses a method for forming a gas-barrier layer composed of a specified amount of an ethylene-vinyl alcohol copolymer resin and an inorganic filler. However, the packaging containers obtained by this method still have problems; for example, their gas-barrier properties are still at low levels under high humidity conditions, and high levels of gas-barrier properties are obtained only when the gas-barrier layer is sufficiently thick. When, using such coating material, the coating layer is thickened for the manifestation of sufficient gas-barrier properties, the weight increases, making it difficult to transport and handle the containers and, further, increasing the cost thereof. Accordingly, a coating material with a gas-barrier property capable of manifesting satisfactory gas-barrier properties even when the gas-barrier layer thickness is reduced as far as possible is earnestly demanded.

On the other hand, paper packaging containers mainly occur as box-shaped containers because of the difficulty in manufacturing complicatedly shaped ones. However, they can be shaped without using any special molds, heat or the like and are highly opaque to light and, nowadays, there is a growing demand for them as paper/plastic film composite materials, in particular as containers for drinks such as sake and milk, which are readily deteriorated upon exposure to ultraviolet rays. However, the material used as the gas-barrier layer is an aluminum foil or aluminum vapor deposited film, so that the special feature of paper containers that they can be incinerated cannot be utilized in this case. Thus, a substitute gas-barrier layer-forming material sufficiently reduced in loading potential in incineration has been demanded.

SUMMARY OF THE INVENTION

It is an object of the present invention to solve the problems discussed above and provide a coating material with a gas-barrier property which can give a very transparent packaging material with a satisfactory gas-barrier property when it has a thin gas-barrier layer and, when it has a gas-barrier layer with an ordinary thickness, can give a packaging material with a higher gas-barrier property. Another object is to provide a process for producing such coating material with a gas-barrier property and a packaging container with a high gas-barrier level obtained by coating with such coating material with a gas-barrier property.

The invention provides
a coating material composition with a gas-barrier property
which comprises, as essential components, an ethylene-vinyl alcohol copolymer (A) obtained by saponifying an ethylene-vinyl acetate copolymer, an inorganic layered compound (B) and a solvent,
wherein the total amount of (A) and (B) is 1 to 30% by mass and the mass ratio (A)/(B) is (30/70) to (50/50).

The invention also provides
a process for producing the above-mentioned coating material composition with a gas-barrier property
which comprises the step of mixing the inorganic layered compound (B) in a solution of the ethylene-vinyl alcohol copolymer (A) and dispersing the inorganic layer compound (B) in the above solution under a pressure of not lower than 10 MPa using a high-pressure dispersing device.

The invention further provides
a gas-barrier composite plastic film or sheet
which is obtained by coating at least one side of a plastic film or sheet made of at least one plastic selected from the group consisting of polyolefins, polyesters, polyamides and polystyrenes with the above-mentioned coating material composition with a gas-barrier property to at a coating weight so as to give a dry coat layer thickness of 0.1 to 100 μm.

The invention further provides
a gas-barrier packaging container
which is obtained by shaping the above-mentioned gas-barrier composite plastic film.

The invention further provides
a gas-barrier packaging container
which is obtained by shaping the above-mentioned gas-barrier composite plastic sheet.

The invention still further provides
a gas-barrier packaging container
which is obtained by further coating a plastic container shaped in the form of a tube, tray, cup, box or bottle with the above-mentioned coating material composition with a gas-barrier property at a coating weight so as to give a dry coat thickness of 0.1 to 100 μm.

The invention further provides
a gas-barrier packaging container
which is formed of a composite layer composed of paper and the above-mentioned gas-barrier composite plastic film or sheet.

DETAILED DESCRIPTION OF THE INVENTION

In the following, the invention is described more specifically.

1. Coating Material Composition with a Gas-Barrier Property

<Ethylene-Vinyl Alcohol Copolymer>

The ethylene-vinyl alcohol copolymer (A) (hereinafter sometimes referred to also as "EVOH") to be used in the coating material composition with a gas-barrier property according to the invention is obtained by saponifying an ethylene-vinyl acetate copolymer. The ethylene-vinyl alcohol copolymer (A) is preferably one having an ethylene component content of 20 to 60 mole percent and a degree of saponification of a vinyl acetate component of not lower than 95 mole percent.

In the case of ethylene-vinyl alcohol copolymers, decreases in ethylene component content result in improvements in the gas-barrier property in a dry atmosphere but tend to cause decreases or deteriorations in the water resistance, moisture resistance and stress cracking resistance of the gas-barrier layer and in the gas-barrier property thereof under high humidity conditions. On the other hand, increases in ethylene component content result in improvements in the water resistance and moisture resistance of the gas-barrier layer but tend to result in deteriorations in the gas-barrier properties in a dry atmosphere.

Furthermore, as the degree of saponification of a vinyl acetate component decreases, the gas-barrier property and oil resistance, for example, of the gas-barrier layer tend to be deteriorated.

However, when an ethylene-vinyl alcohol copolymer (A) having an ethylene component content and a degree of saponification of a vinyl acetate component within the above-mentioned respective ranges is used, it is possible to obtain good gas-barrier layers balanced among all the property characteristics mentioned above.

Furthermore, the solubility in those solvents which will be described later herein, for example, of an ethylene-vinyl alcohol copolymer can be adjusted by cleaving molecular chains using hydrogen peroxide and the like. Such a solubility-adjusted ethylene-vinyl alcohol copolymer (A) is preferably used in the coating material composition with a gas-barrier property of the invention.

<Inorganic Layered Compounds>

Preferably used as the inorganic layered compound (B) in the coating material composition with a gas-barrier property of the invention are inorganic layered compounds capable of swelling and cleaving in certain solvents. Among those, swelling clay minerals are preferred. Clay minerals are classified into two types, namely the bilayer-structured type comprising a silica tetrahedral layer and an octahedral layer with aluminum, magnesium or the like metal as the central metal as occurring above the silica layer, and the three-layer-structured type comprising two silica tetrahedral layers and an octahedral layer with aluminum, magnesium or the like metal as the central metal as sandwiched between the two silica layers. The former includes the kaolinite group, antigorite group and the like, and the latter includes, according to the number of interlaminar cations, the smectite group, vermiculite group, mica group and the like. More specifically, there may be mentioned kaolinite, dickite, nacrite, halloysite, antigorite, chrysotile, pyrophyllite, montmorillonite, beidellite, hectorite, saponite, stevensite, tetrasilic mica, sodium taeniolite, muscovite, margarite, talc, vermiculite, phlogopite, xanthophyllite, chlorite and the like. These may be natural products or synthetic products. Scaly silica and the like can also be used. These may be used singly or two or more of them may be used in combination.

Among those, montmorillonite is preferably used in view of the gas-barrier property and printability attainable by using the same in the coating material composition.

<Solvent>

The solvent for the above-mentioned EVOH may be either an aqueous or a nonaqueous solvent capable of dissolving EVOH. In particular, when a mixture composed of 30 to 95% by mass of water and 5 to 70% by mass of at least one of lower alcohols containing 2 to 4 carbon atoms, namely ethyl alcohol, propyl alcohols and butyl alcohols, is used in the coating material composition with a gas-barrier property of the invention for maintaining an appropriate solid content, the solubility of EVOH is favorably improved; therefore, such a mixture is preferably used. In this case, isopropyl alcohol is preferred as the alcohol component from the viewpoint of rate of evaporation, miscibility with water, and the like. Solvent systems with an alcohol content exceeding 70% by mass are not preferred since the cleaving behavior and/or dispersibility of the inorganic layered compound tends to become deteriorated or insufficient.

<Contents of the EVOH and Inorganic Layered Compound and Mixing Ratio Between them>

The total amount of the EVOH (A) and inorganic layered compound (B) to be used in the practice of the invention is 1 to 30% by mass relative to the total amount of the coating material composition with a gas-barrier property. When the total amount of the EVOH (A) and inorganic layered compound (B) is less than 1% by mass, the thickness of the gas-barrier layer which can be formed by one coating operation becomes thin and, therefore, in cases where a thick gas-barrier layer is required, repetitions of the coating operation become necessary, hence the workability in coating may be reduced. On the other hand, when that total amount exceeds 30% by mass, there appears a tendency for the fluidity, for example, of the coating material to unfavorably decrease.

The mass ratio (A)/(B) between the EVOH (A) and inorganic layered compound (B) to be used in accordance with the invention is within the range of (30/70) to (50/50). When the proportion of the inorganic layered compound (B) is smaller than 50% by mass, any sufficient level of barrier property against oxygen under high humidity conditions cannot be provided and, when it exceeds 70% by mass, the adhesion between the coating and base material becomes unfavorably insufficient. The above-mentioned coating material composition with a gas-barrier property comprises the solvent, EVOH (A) and inorganic layered compound (B) as essential components and may contain another or other components or ingredients. Preferably, however, the solid matter is mostly constituted of (A) and (B) and, in that case, the effects of (A) and (B) can be produced to a satisfactory extent.

The mass ratio between the EVOH (A) and inorganic layered compound (B) ((A)/(B)) is the mass ratio calculated on the solid matter basis.

<Other Additives>

The coating material composition with a gas-barrier property of the invention may contain one or more of various additives such as colorants, leveling agents, antifoaming agents, crosslinking agents, ultraviolet absorbers, antistatic agents, preservatives and the like for improving various performance characteristics so long as the gas-barrier properties are not deteriorated.

<Process for Producing Coating Material Compositions>

The process for producing coating material compositions by causing the ethylene-vinyl alcohol resin (A) and inorganic layered compound (B) to be contained in the solvent is not particularly restricted so long as the desired performance characteristics can be acquired. Thus, for example, mention may be made of the process comprising adding the inorganic layered compound (B) (if necessary after preliminary swelling and cleavage in a dispersion medium such as water) to a solution of the ethylene-vinyl alcohol resin (A), followed by mixing up to disperse the inorganic layered compound (B) therein; the process comprising adding (dissolving) the ethylene-vinyl alcohol resin (A) (if necessary after preliminary dissolution in a solvent) to (in) a dispersion of the inorganic layered compound (B) in a dispersion medium such as water as obtained after swelling and cleavage; and the like.

As a method for promoting the cleavage of the inorganic layered compound, use may be made of the method comprising utilizing a high-speed stirrer or a dispersing device in carrying out the agitation/dispersion of a dispersion of the inorganic layered compound in a dispersion medium such as water or of a mixture liquid resulting from addition and blending of the ethylene-vinyl alcohol resin (A) and inorganic layered compound (B) to and in the above-mentioned solvent.

The use of a high-pressure dispersing device or an ultrasonic dispersing device as the dispersing device is preferred since it makes it possible to obtain a transparent dispersion in which the dispersibility of the inorganic layered compound is good. As examples of the high-pressure dispersing device which can be suitably utilized, there may be mentioned Gaulin (product of APV Gaulin), Nanomizer (product of Nanomizer Inc.), Microfluidizer (product of Microfluidics), Ultimaizer (product of Sugino Machine Limited), DeBee (product of B.e.e. International LTD.), Niro Soavi homogenizer (product of Niro Soavi S.p.A.) and the like and, using these machines, the dispersion treatment is more preferably carried out generally at a pressure of not lower than 10 MPa. These are all product names. When the pressure condition exceeds 100 MPa, the inorganic layered compound (B) can be readily comminuted, possibly leading to failure to attain the desired sufficient gas-barrier properties; hence, it is desirable that the pressure be not higher than 100 MPa.

The gas-barrier layer obtained by applying the coating material with a gas-barrier property of the invention as obtained by the above-mentioned materials and production process, even when it is a particularly thin gas-barrier layer, has high levels of gas-barrier properties even under high humidity conditions.

2. Packaging Containers

Now, the gas-barrier packaging containers obtained by applying the coating material with a gas-barrier property of the invention, and the like, are described.

First, the intended use of the packaging containers obtained in accordance with the invention is mainly as packaging containers various in form and shape for packaging foods and drugs and are roughly divided into plastic packaging containers and paper packaging containers according to the base material thereof.

<Plastic Packaging Containers>

The material to be used as the base material of plastic packaging containers is not particularly restricted but may be any of those thermoplastic resins and the like utilized generally in manufacturing packaging containers and capable of forming containers. Specifically, there may be mentioned polyolefins or copolymer resins derived from an olefin(s) and another monomer(s) such as polyethylene (low-density, high-density), ethylene-propylene copolymers, polypropylene, ethylene-vinyl acetate copolymers, ethylene-methyl methacrylate copolymers and ionomer resins; polyester resins such as polyethylene terephthalate, polybutylene terephthalate and polyethylene naphthalate; polyamide resins such as nylon-6, nylon-6,6, metaxylenediamine-adipic acid polycondensates and polymethylmethacrylimide; acrylic resins such as polymethyl methacrylate; hydrophobic cellulose derivatives such as cellulose acetate and cellulose diacetate; polystyrenes or copolymer resins derived from styrene and acrylonitrile or the like, for example polystyrene, styrene-acrylonitrile copolymers and styrene-acrylonitrile-butadiene copolymers; other various polymers such as polyacrylonitrile resins, polyvinyl alcohol resins, ethylene-vinyl alcohol copolymers, cellulose derivatives, polycarbonate resins, polysulfone resins, polyethersulfone resins, polyetheretherketone resins, polyphenylene oxide resins and polymethylene oxide resins. These may be used singly or two or more of them may be used in combination. And, at least one species selected from the group consisting of polyolefins, polyesters, polyamides and polystyrenes is more preferred.

Furthermore, the plastic base material to be coated with the coating material composition with a gas-barrier property of the invention may have a film, sheet or the like form before shaping into containers or may have a final container form as a result of shaping. It may be made of a single layer or a composite layer.

a. Gas-Barrier Packaging Containers Obtained by Providing a Film- or Sheet-Like Base Material with a Gas-Barrier Layer In cases where a plastic film or sheet is used as the base material of packaging containers, it shows advantages in its ready coatability with the coating material composition with a gas-barrier property and further in its printability and capability of being decorated otherwise, although it cannot be shaped into very complicated shapes. As for the difference in a film and a sheet, the definitions given in the "Packaging terms" in a Japanese Industrial Standard (JIS Z 0108) are applied herein. Thus, a "plastic film" is a membranous plastic molding having a thickness less than 0.25 mm, and a "plastic sheet" is a thin sheet-like plastic molding having a thickness not less than 0.25 mm. The above definitions apply herein as well.

As regards the process for manufacturing gas-barrier packaging containers using such a plastic film or sheet, at least one side of such base material is first coated with the coating material composition with a gas-barrier property of the invention to give a plastic film or sheet provided with a gas-barrier layer. The thus-obtained gas-barrier composite plastic film or sheet constitutes an aspect of the present invention, and that kind of gas-barrier composite packaging container which is to be described later herein is preferably obtained by shaping such film or sheet.

Here, for improving the adhesion between the base material surface and gas-barrier layer, that surface may be coated with any of various anchor coating compositions and adhesives, for example of the isocyanate, imine or the like type, according to need prior to be coated with the coating material composition with a gas-barrier property, or that surface may be decorated by printing using printing inks or the like. The method of applying the coating material composition with a gas-barrier property and an anchor coating composition or adhesive can be properly selected from among various coating methods such as roll coating methods including flexography and gravure coating, and bar coating, rod coating, doctor knife coating, air knife coating, spray coating, dipping and the like techniques, and the method of printing using printing inks can be adequately selected from among the printing methods known in the art.

Furthermore, in cases where a plastic film is utilized, it can be shaped into the desired bag-like packaging container form generally by preparing a composite film by lamination with a heat-meltable polymer, joining the heat-meltable polymer surfaces together and heat-sealing peripheral portions. Utilizable as the method for laminating the plastic film with the heat-meltable polymer are, for example, the method comprising coating the side of the plastic film, to which the gas-barrier layer is provided, or the opposite side thereto with such a heat-meltable polymer as polyethylene or ethylene-vinyl acetate copolymer in a molten state under pressure for lamination; the method comprising bonding a film of the heat-meltable polymer to the plastic film via an adhesive layer; the method comprising coating the plastic film with a solution of a hot melt adhesive in a solvent or the like; and the like methods.

When, on the other hand, a sheet, from which packaging containers can be more easily shaped, is used as the base material itself, the sheet can be shaped into packaging containers having a desired shape, for example cups, trays or the like, by punching out predetermined shapes from the sheet according to need and shaping the shapes by (heat) press molding using a mold or the like. When the extent of expansion and contraction of the base material is great in the shaping process and the gas-barrier layer cannot maintain its continuous layer condition, however, the method comprising preliminarily shaping the base material into a final container shape and then providing the intermediate product containers with a gas-barrier layer, as described later herein, is preferably utilized.

Furthermore, it is also possible to obtain packaging containers having gas-barrier, heat-insulating and the like properties by laminating the gas-barrier composite plastic film or sheet obtained by the above-mentioned process with an expandable film or sheet and subjecting the whole to processing for expansion and shaping.

b. Gas-Barrier Packaging Containers Obtained by Providing Base Materials Having a Final Container Shape with a Gas-Barrier Layer Gas-barrier packaging containers can be produced by coating plastic base materials having a final packaging container shape as obtained, for example, by shaping a sheet- or plate-shaped plastic in the manner of pressure forming or vacuum forming or by heating and melting a plastic material in the form of a powder, chips, pellets, tablets or rods and molding the melt in the manner of injection molding, compression molding, cast molding, blow molding or the like with the coating material composition with a gas-barrier property of the invention by various coating methods.

The packaging containers may have such a typical shape as a box, tube, tray, cup or bottle or any other arbitrary shape. And, as regards the method of applying the coating material composition with a gas-barrier property, a method suited for coating complicatedly shaped base material surfaces, for example the spray coating method, dipping method or the like, is more suitable.

The place to which the coating material composition with a gas-barrier property may be the outside or inside of the container, or both sides may be coated. In cases where the container outside is provided with a gas-barrier layer, it is possible to obtain more suitable packaging container by further providing the gas-barrier layer with an external plastic film or polymer coat layer for the protection of the gas-barrier layer.

<Paper Packaging Containers>

When paper is used as the packaging container base material, it is generally utilized in the form of a composite material resulting from lamination of paper for maintaining the container shape with a plastic film for preventing the penetration or leakage of a liquid food. The constitution thereof is not particularly restricted so long as good packaging containers can be obtained. In the case of packaging containers for milk or the like, for example, there may be mentioned, for example, such four-layer or five-layer constitution as polyethylene/(gas-barrier layer (1))/paper/(gas-barrier layer (2))/polyethylene. The constitution may comprise at least either one of the gas-barrier layer (1) and gas-barrier layer (2). In the case of packaging containers for sake, there may be mentioned a constitution further increased in the number of component material layers, for example a five- to seven-layer constitution such as polyethylene/(gas-barrier layer (1))/polyethylene/(gas-barrier layer (2))/paper/(gas-barrier layer (3)/polyethylene in the order from the innermost side (liquid-contacting face). The constitution may comprise at least one of the gas-barrier layers (1) to (3).

As for the method for providing paper containers with a gas-barrier layer or layers utilizing the coating material composition with a gas-barrier property of the invention, the method comprising first bonding a plastic film or sheet coated with the coating material composition with a gas-barrier property in the same manner as mentioned above to paper to give a paper-plastic film composite material can be suitably utilized for example.

Utilizable as the method for producing packaging containers using the above paper-plastic composite material are, for example, the method comprising cutting the paper-plastic composite material into a predetermined form and bonding flaps for fastening together using an adhesive or the like for shaping it to a predetermined shape, the method comprising laminating the surface to face another with a heat-meltable resin and effecting fusion by heating, and the like methods.

<Gas-Barrier Layer Thickness>

As for the gas-barrier packaging containers obtained by providing base materials having a final container shape with a gas-barrier layer, or the gas-barrier composite plastic film or sheet obtained by the process mentioned above, the gas-barrier layer formed with the coating material composition with a gas-barrier property of the invention preferably has a dry gas-barrier coat layer thickness of 0.1 to 100 µm. When the gas-barrier layer thickness is thinner than 0.1 µm, it is difficult to attain the desired gas-barrier properties and, when it exceeds 100 µm, further increases in layer thickness will result in no further improvements in gas-barrier properties and the resulting containers will be unfavorable for the use in the fields where high transparency is required. A layer thickness of about 0.1 to 50 µm is more preferred. As the gas-barrier layer thickness increases, it becomes difficult for the layer to follow the container deformation and cracking or the like tends to occur readily. Therefore, in particular when a film-shaped base material is used, it is desirable that the gas-barrier layer have a thickness of about 0.1 to 5.0 µm.

In cases where the gas-barrier composite plastic film or sheet in which the coating material composition with a gas-barrier property of the invention is used or packaging containers obtained therefrom are required to have gas-barrier properties rather than transparency, it is advantageous to provide thick gas-barrier layers and, in cases where a high level of transparency is required, it is advantageous to provide thin gas-barrier layers. In either case, however, the gas-barrier layers obtained have better gas-barrier properties as compared with the prior art gas-barrier layers provided by the coating technique and having the equivalent transparency and have better transparency as compared with the prior art gas-barrier layers having the equivalent gas-barrier properties.

<Uses of the Packaging Containers>

The packaging containers obtained from the materials mentioned above by the process mentioned above can be suitably utilized as containers for foods and drugs. As the uses for foods, for example, there may be mentioned, for example, packaging bags or pouches for snack foods, instant noodles, boiled/retort foods and the like, tubular containers for mayonnaise, ketchup and the like, cup-shaped containers for dried foods such as noodles, miso soups, soups and the like or for puddings and jellies, tray-shaped containers for lunches, daily dishes and the like, bottle-shaped containers for drinks, cooking oils, seasoning and the like, bottle-shaped containers for alcohol drinks, milks and the like, and the like.

As the uses for drugs, there may be mentioned, for example, bags or bottles for various powdery, tablet-form and liquid drugs and cup-shaped and tubular containers for ointments and the like.

The coating material composition with a gas-barrier property of the invention obtained from the above-mentioned materials by the above-mentioned method, when used to give a gas-barrier layer having a coat film thickness within the range of from about 0.1 µm, that is very thin, to relatively thick, namely about 100 µm, can give packaging containers adequately meeting the performance characteristics requirements imposed, for example packaging containers having good transparency together with sufficient gas-barrier properties, and packaging containers having very good gas-barrier properties while maintaining the transparency.

BEST MODES FOR CARRYING OUT THE INVENTION

The following examples illustrate the present invention in further detail. These are, however, by no means limitative of the scope of the invention unless the mode of practice deviates from the spirit and application range thereof. In the following description, "%" means "% bymass" and "part(s)" means "part(s) by weight".

Preparation of EVOH Solutions

Preparation Example 1

To 60 parts of a mixed solvent composed of 50% of purified water and 50% of isopropyl alcohol (IPA) was added 30 parts of EVOH (product name: "SoarnoL(R) D-2908", product of Nippon Synthetic Chemical Industry Co., Ltd.), followed by further addition of 10 parts of a 30% aqueous solution of hydrogen peroxide. The mixture was warmed to 80° C. with stirring and the reaction was allowed to proceed for about 2 hours.

Then, after cooling, catalase was added to a concentration of 3000 ppm to thereby eliminate the residual hydrogen peroxide. In this manner, an almost transparent EVOH solution (solution 1) with a solid content of 30% was obtained.

Preparation Example 2

To 70 parts of a mixed solvent composed of 50% of purified water and 50% of isopropyl alcohol (IPA) was added 20 parts of EVOH (product name: "SoarnoL(R) D-2908", product of Nippon Synthetic Chemical Industry Co., Ltd.), followed by further addition of 10 parts of a 30% aqueous solution of hydrogen peroxide. The mixture was warmed to 80° C. with stirring and the reaction was allowed to proceed for about 2 hours. Then, after cooling, catalase was added to a concentration of 3000 ppm to thereby eliminate the residual hydrogen peroxide. In this manner, an almost transparent EVOH solution (solution 2) with a solid content of 20% was obtained.

Preparation of an Inorganic Layered Compound Dispersion

Preparation Example 1

5 parts of the inorganic layered compound montmorillonite (product name: "Kunipia F", product of Kunimine Industries Co., Ltd.) was added to 95 parts of purified water with stirring and sufficiently stirred for effecting dispersion using a high-speed stirrer. Thereafter, the mixture was kept at 40° C. for 1 day. An inorganic layered compound dispersion (dispersion 1) with a solid content of 5% was thus obtained.

Example 1

(Ethylene-Vinyl Alcohol Copolymer (A)/Inorganic Layered Compound (B)=40/60)

4 parts of the EVOH solution 1 was added to 60 parts of a mixed solvent composed of 50% of purified water and 50% of IPA, followed by stirring for thorough blending. Furthermore, 36 parts of the inorganic layered compound dispersion 1 was added to the above solution with stirring at a high speed, and the resulting mixture was subjected to dispersion treatment at a pressure set at 50 MPa in a high-pressure dispersing device. The thus-obtained coating material composition with a; gas-barrier property with a solid content ((A)+(B)) of 3% was homogeneous and stable.

Comparative Example 1

(Ethylene-Vinyl Alcohol Copolymer (A)/Inorganic Layered Compound (B)=20/80)

2 parts of the EVOH solution 1 was added to 50 parts of a mixed solvent composed of 50% of purified water and 50% of IPA, followed by stirring for thorough blending. Furthermore, 48 parts of the inorganic layered compound dispersion 1 was added to the above solution with stirring at a high speed, and the resulting mixture was subjected to dispersion treatment at a pressure set at 50 MPa in a high-pressure dispersing device. The thus-obtained coating material composition with a gas-barrier property with a solid content ((A)+(B)) of 3% was homogeneous and stable.

Comparative Example 2

(Ethylene-Vinyl Alcohol Copolymer (A)/Inorganic Layered Compound (B)=70/30)

7 parts of the EVOH solution 1 was added to 75 parts of a mixed solvent composed of 50% of purified water and 50% of IPA, followed by stirring for thorough blending. Furthermore, 18 parts of the inorganic layered compound dispersion 1 was added to the above solution with stirring at a high speed, and the resulting mixture was subjected to dispersion treatment in a high-pressure dispersing device. The thus-obtained coating material composition with a gas-barrier property with a solid content ((A)+(B)) of 3% was homogeneous and stable.

Comparative Example 3

(Ethylene-Vinyl Alcohol Copolymer (A)/Inorganic Layered Compound (B)=40/60)

1 part of the EVOH solution 2 was added to 93 parts of a mixed solvent composed of 50% of purified water and 50% of IPA, followed by stirring for thorough blending. Furthermore, 6 parts of the inorganic layered compound dispersion 1 was added to the above solution with stirring at a high speed, and the resulting mixture was subjected to dispersion treatment in a high-pressure dispersing device. The thus-obtained coating material composition with a gas-barrier property with a solid content ((A)+(B)) of 0.5% was homogeneous and stable.

Comparative Example 4

(Ethylene-Vinyl Alcohol Copolymer (A)/Inorganic Layered Compound (B)=40/60)

EVOH (14 parts; product name: "SoarnoL(R) D-2908", product of Nippon Synthetic Chemical Industry Co., Ltd.) was added to 65 parts of a mixed solvent compound of 50% of a 30% aqueous solution of hydrogen peroxide and 50% of isopropyl alcohol (IPA), the mixture was warmed to 80° C. with stirring and the reaction was allowed to proceed for about 2 hours. Then, after cooling, catalase was added to a concentration of 7000 ppm to thereby eliminate the residual hydrogen peroxide and, further, 21 parts of montmorillonite (product name: "Kunipia F", product of Kunimine Industries Co., Ltd.) was added, followed by stirring. The thus-obtained coating material composition with a gas-barrier property with a solid content ((A)+(B)) of 35% was lacking in fluidity and failed to give any uniform coat layer, hence was not subjected to any further evaluation.

Gas-Barrier Layer Formation with the Compositions of Example 1 and Comparative Examples 1 to 3

Each of the coating material composition with a gas-barrier property of Example 1 and Comparative Examples 1 to 3 was filtered through a 255-mesh filter, and the filtrate was applied, with a bar coater, to an OPP film (product name: "PYLEN P-2161", product of Toyobo Ltd., thickness: 25 μm) coated with a urethane type anchor coat agent to a gas-barrier layer thickness set at 0.3 μm or 1.0 μm as a dry film thickness. To obtain the same gas-barrier layer thickness as that obtained by one coating operation with the composition of Example 1 using the composition of Comparative Example 3, it was necessary to repeat about 6 times the coating operation under the same coating conditions as with the composition of Example 1.

Evaluation Methods (1) Oxygen Transmission Rate

Oxygen transmission rate (OTR value) measurements were carried out according to JIS K 7126 Method B using an oxygen transmission rate test system (product name: "OX-TRAN 100", product of Mocon Inc.). As for the measurement conditions, the tests were carried out in an atmosphere of 23° C. and 80% RH (relative humidity).

(2) Transparency

The transparency of each of the coated articles was evaluated by the eye. The following three grades were employed in making a judgment based on the condition of the test article: A: equivalent to the base material; B: nearly transparent; C: cloudy.

(3) Adhesion to the Base Material

X-shaped cuts, about 3 to 4 cm in length, were made in the surface of each thin film coating with a cutter knife, and an adhesive tape was put thereon. The adhesive tape affixed was peeled off at a stroke, and the state of peeling off of the thin coating layer was observed by the eye. Based on that state of peeling, the judgment was made in two grades: A: no peeling at all; B: peeling observed.

The results of these evaluations are shown below in Table 1.

TABLE 1

|  | Layer thickness (μm) | Oxygen transmission rate (cm³/m² · day · kPa) | | Transparency | Adhesion to base material |
| --- | --- | --- | --- | --- | --- |
|  |  | Measured value | Reduced value*1 |  |  |
| Base Material OPP | — | $1.78 \times 10^1$ | — | A | — |
| Example 1 | 0.3 | $1.78 \times 10^{-1}$ | $5.33 \times 10^{-2}$ | A | A |
|  | 1 | $1.58 \times 10^{-1}$ | $1.58 \times 10^{-1}$ | B | A |
| Comp. Example 1 | 0.3 | $1.48 \times 10^{-1}$ | $4.44 \times 10^{-2}$ | B | B |
|  | 1 | $1.28 \times 10^{-1}$ | $1.28 \times 10^{-1}$ | C | B |
| Comp. Example 2 | 0.3 | $4.93 \times 10^{-1}$ | $1.48 \times 10^{-1}$ | A | A |
|  | 1 | $2.96 \times 10^{-1}$ | $2.96 \times 10^{-1}$ | A | A |
| Comp. Example 3 | 0.3 | $1.86 \times 10^{-1}$ | $5.58 \times 10^{-2}$ | A | A |
|  | 1 | $1.60 \times 10^{-1}$ | $1.60 \times 10^{-1}$ | B | A |

In Table 1 given above, the "reduced value*1" is the oxygen permeability value calculated under the assumption that the gas-barrier layer thickness is 1 μm.

From Table 1, it is evident that the coating material composition with a gas-barrier property of Example 1, even when applied to form a layer with a thickness as thin as 0.3 μm, provided sufficient gas-barrier properties and could maintain the transparency at a level almost the same as that of the base material film. Furthermore, it is seen that when a 1.0-μm-thick layer was formed from that composition, the layer showed better gas-barrier properties.

On the contrary, the coating material composition with a gas-barrier property of Comparative Example 1, in which the content ratio of the inorganic layered compound to the EVOH was higher than the range specified according to the invention, cannot be said to have been satisfactory in transparency and in the adhesion to the base material film, whereas the coating material composition with a gas-barrier property of Comparative Example 2, in which the ratio mentioned above was lower than the range specified according to the invention, cannot be said to have been satisfactory in gas-barrier properties.

The coating material composition with a gas-barrier property of Comparative Example 3, in which the total amount of the EVOH and inorganic layered compound was lower than the range specified according to the invention, required a number of repetitions of the coating operation to obtain a layer equivalent in gas-barrier properties to that of Example 1, hence it was poor in applicability.

INDUSTRIAL APPLICABILITY

The gas-barrier layers obtained using the coating material composition with a gas-barrier property of the invention, even when thinner as compared with the prior art ones, can show high-level gas-barrier properties and, thus, the two contradictory performance characteristics, namely transparency and gas-barrier properties, both can be acquired simultaneously at high levels. Therefore, it is now possible to produce packaging containers showing good performance characteristics in those fields in which both the performance characteristics mentioned above are required.

Furthermore, as the gas-barrier layer becomes thinner, the transparency increases and, as the layer becomes thicker, higher-level gas-barrier properties can be obtained. Therefore, it is also possible to produce packaging containers showing good performance characteristics in the fields where higher transparency is required or in the fields where higher-level gas-barrier properties are required.

By utilizing the coating material composition with a gas-barrier property of the invention which has such characteristic features as mentioned above, it becomes possible to produce packaging containers capable of producing excellent effects in the fields of foods, drugs and like materials particularly susceptible to deterioration or the like changes due to oxygen and/or water vapor.

The invention claimed is:

1. A coating material composition with a gas-barrier property
    which comprises, as essential components, an ethylene-vinyl alcohol copolymer (A) obtained by saponifying an ethylene-vinyl acetate copolymer, an inorganic layered compound (B) and a solvent,
    wherein the total amount of (A) and (B) is 1 to 30% by mass and the mass ratio (A)/(B) is (30/70) to (50/50), and wherein the inorganic layered compound (B) is montmorillonite.

2. The coating material composition with a gas-barrier property according to claim 1
    wherein said ethylene-vinyl alcohol copolymer (A) has an ethylene component content of 20 to 60 mole percent and a degree of saponification of a vinyl acetate component of not lower than 95 mole percent.

3. A process for producing the coating material composition with a gas-barrier property according to claim 1 or 2
    which comprises the step of mixing the inorganic layered compound (B) in a solution of the ethylene-vinyl alcohol copolymer (A) and dispersing the inorganic layer compound (B) in the above solution under a pressure of not lower than 10 MPa using a high-pressure dispersing device.

4. A gas-barrier composite plastic film or sheet
    which is obtained by coating at least one side of a plastic film or sheet made of at least one plastic selected from the group consisting of polyolefins, polyesters, polyamides and polystyrenes with the coating material composition with a gas-barrier property according to claim 1 or 2 at a coating weight so as to give a dry coat layer thickness of 0.1 to 100 μm.

5. A gas-barrier packaging container
    which is obtained by shaping the gas-barrier composite plastic film according to claim 4.

6. A gas-barrier packaging container
    which is formed of a composite layer composed of paper and the gas-barrier composite plastic film or sheet according to claim 4.

7. A gas-barrier packaging container
    which is obtained by further coating a plastic container shaped in the form of a tube, tray, cup, box or bottle with the coating material composition with a gas-barrier property according to claim 1 or 2 at a coating weight so as to give a dry coat thickness of 0.1 to 100 μm.

8. The coating material composition with a gas-barrier property according to claim 1 wherein the solvent comprises an alcohol containing 2 to 4 carbon atoms.

* * * * *